United States Patent [19]
Dunn et al.

[11] Patent Number: 5,905,785
[45] Date of Patent: *May 18, 1999

[54] DETECTING HIGH USAGE TELECOMMUNICATIONS LINES

[75] Inventors: James Patrick Dunn, Sandwich; Don Howard Dvorak, Hinsdale; Mark Alan Lassig, Naperville, all of Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,837

[22] Filed: Jan. 23, 1997

Related U.S. Application Data

[63] Continuation-in-part of application No. 08/693,768, Aug. 7, 1996.
[51] Int. Cl.[6] .................................................. H04M 15/00
[52] U.S. Cl. .............................. 379/113; 379/1; 379/34; 379/100.15; 379/134
[58] Field of Search ..................................... 379/113, 134, 379/133, 135, 136, 137, 138, 139, 28, 111, 112, 100.03, 100.05, 1, 9, 10, 15, 34

[56] References Cited

U.S. PATENT DOCUMENTS

| | | |
|---|---|---|
| 4,197,427 | 4/1980 | Hutcheson et al. . |
| 4,291,200 | 9/1981 | Smith . |
| 4,907,256 | 3/1990 | Higuchi et al. .......................... 379/113 |
| 5,490,199 | 2/1996 | Fuller et al. ................................ 379/1 |

OTHER PUBLICATIONS

L. Freimanis et al.; No. 1 ESS Scanner, Signal Distributor, Central Pulse Distributor; Bell System Technical Journal (BSTJ), v. 43, No. 5, Part 2, pp. 2255–2263, Sep. 1964.

Primary Examiner—Vivian Chang
Assistant Examiner—Binh K. Tieu
Attorney, Agent, or Firm—Werner Ulrich

[57] ABSTRACT

High usage lines in a telecommunications system must be detected to avoid local areas of high call blockage. Such high usage lines are frequently lines that originate or receive data calls. The presence of a data call is detected by testing for a signal, such as a tone, on the call connection after an answer signal has been detected, and testing to see if the duration of the call exceeds some predetermined quantity. Lines which originate or receive data calls exceeding the predetermined quantity are then monitored to measure their usage. Advantageously, many high usage lines can be detected by monitoring only the relatively few lines that originate or receive data calls.

19 Claims, 3 Drawing Sheets

DETECTING HIGH USAGE TELECOMMUNICATIONS LINES

RELATED APPLICATIONS

This application is a continuation-in-and part of an application with the same title and inventors, Ser. No. 08/693,768, filed Aug. 7, 1996, and assigned to the same assignee as this application.

This application is related to an application by J. P. Dunn, D. H. Dvorak and M. A. Lassig entitled "Special Call Detection," Ser. No. 08/693,767, filed Aug. 7, 1996.

TECHNICAL FIELD

This invention relates to telecommunications systems and more specifically to methods and apparatus for the detection of high usage lines connected to such systems.

PROBLEM

The average telecommunications user, and, specifically, the average telephone user, uses the telephone only for about 10 to 15 percent of the time during the busy hour. Telecommunication systems are designed to take advantage of this relatively low usage by concentrating a group of users into a smaller number of high traffic access links to the switching network of a telecommunications switching system. The performance of this type of concentration is monitored to insure that the customers connected in one concentrator are not predominantly heavy usage customers who would cause the average level of performance of the concentrator to be degraded because the traffic generated by these heavier users is more than the traffic for which the concentrator was designed. Such heavier users are then normally reassigned to another concentrator.

The introduction of heavy data usage has changed the statistics of customer usage dramatically. Many of these new heavy users, use the telecommunications network for 80 to 100 percent of the time during the busy hour. Clearly, a concentrator cannot handle many such customers without degrading the service for all customers (especially the customers other than the heavy users). Some telecommunications systems provide separate access arrangements for such heavy users by effectively bypassing a concentration stage.

A problem of the prior art is that it is difficult to detect who these heavy users are, since they make what appeared to be normal telephone calls. It is very expensive to monitor individual lines for excessive usage, because of the extra data processing required for every call and because of the large amount of memory required for such monitoring. These users may join the network at anytime since they are not required to identify themselves as being data customers. As a result, the process of administrating a telecommunications switch has become more expensive. Concentrators either must be over-engineered or the level of performances of some of the concentrators is degraded from time to time to an unacceptable level. When the performance of a concentrator is degraded, the customers on the concentrator experience delays in dial tone and therefore delays in getting originating calls through. Also calls to such customers are more frequently blocked because access for terminating calls to these customers is denied in the concentrator.

SOLUTION

The above problem is solved and an advance is made over the teachings of the prior art in accordance with our invention, wherein individual calls, optionally, incoming, outgoing, and intra-office, are monitored to detect the presence of a data call and lines which originate or terminate data calls are then further monitored to determine their usage. Advantageously, such an arrangement permits the identification of high occupancy usage data callers and receivers while limiting conventional holding time measurements to a relatively small number of lines.

In accordance with one aspect of applicants' preferred embodiment, monitoring is performed by attaching a tone detector to a line at the beginning of a call in order to detect the in-band "handshake" signals, such as tones, that characterize a data call. In a digital network such a connection maybe readily established by sending the bits stream that represents a communication not only to the normal destination but also to the tone detector. The signal detectors can either be the tone detector that is used for detecting dial pulse or keyed dual tone multi-frequency (DTMF) digits dialed by the customer, enhanced, by conventional means well known in the prior art, to detect the tone signals characteristic of a data call, or they may be separate signal detectors used specifically for detecting data calls or for detecting other types of in-band signals. In the first case, the digit receiver can either stay on the connection until several seconds after the answer signal has been received or a different receiver can be attached immediately after an answer signal is received. In the second case, the signal detector is attached to the connection immediately after an answer signal is received and stays on for a few seconds or until a signal indicating a data call has been positively identified.

Since it is not necessary in this application to detect every data call, it is not necessary to provide extra digit receivers since the detection of data calls maybe suspended during the busiest time. Similarly if special signals detectors are provided, these detectors maybe engineered so that only a fraction of the calls are sampled during the busiest hour while 100 percent of the calls can be sampled during the most idle periods.

Advantageously, this arrangement allows for the economical identification of lines generating a large amount of data traffic; once such lines have been identified they may be further monitored or treated according to conventional methods in order to make sure that their heavy traffic does not degrade the performance of the network with respect to other customers sharing their concentrator.

Obtaining detailed measurements for a particular line requires substantial use of system resources. It is therefore desirable to avoid taking such measurements for lines unless they have demonstrated the use of substantial length data calls. Accordingly, one feature of applicants' invention is to check lines which have participated on a data call and not to make such lines candidates for extensive measurements unless the length of the data call exceeds some minimum duration. In particular, it is desirable to filter out cases of calls to wrong numbers, wherein the wrong number is for a data terminal.

DETAILED DESCRIPTION

Figure 1:
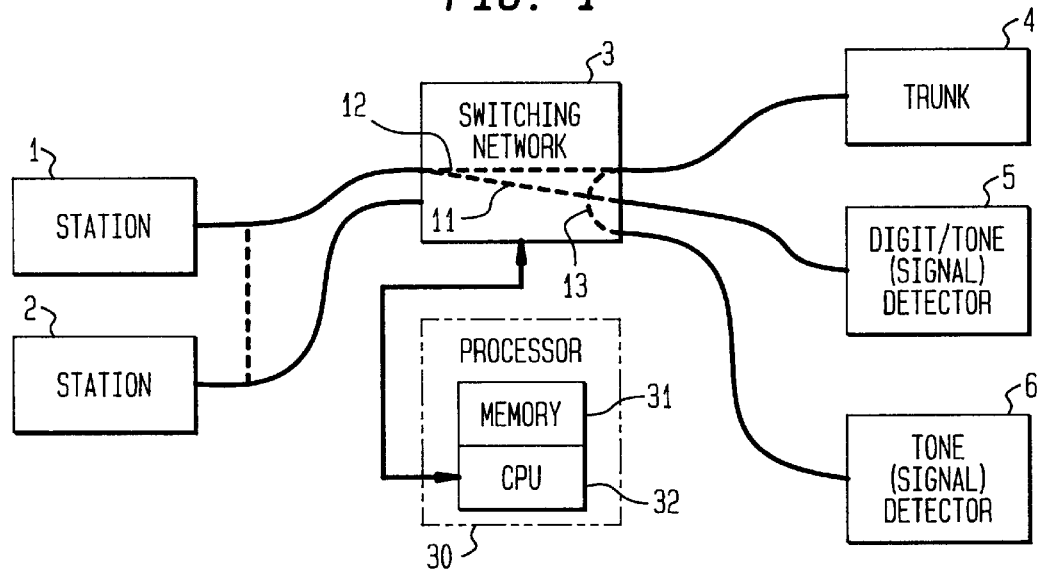
FIG. 1 is a block diagram illustrating applicants' invention.
Figure 2:
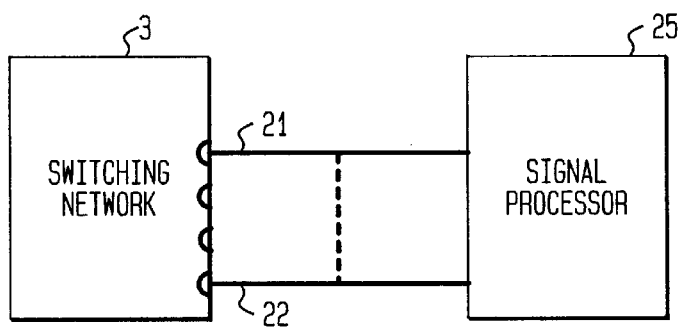
FIG. 2 is a block diagram illustrating a preferred embodiment of data call signal detectors.

FIG. 1 is a block diagram illustrating the basic operation of applicants' invention. A switching network 3, including any special adjuncts for connecting service circuits, such as digit detectors, to the lines or trunks, is used to interconnect stations 1, ..., 2 with outgoing trunks, digit/signal detectors 5, or signal detectors 6. While the digit/signal detectors are shown separately, in practice, the best arrangement is likely to be one wherein any of the digit/signal detectors 5 and signal detectors 6 can be used for both functions, i.e., the function of detecting dialed or keyed digits from customers and the function of detecting the signals which characterize a data connection. In applicants' preferred embodiment, the signals are tones and only a single type of detector is used. This detector is the conventional digit/tone detector 5 used for detecting dialed or keyed digits augmented to recognize the additional tones of a data connection. FIG. 2 is the preferred implementation for such detectors it consists of a signal processor 25 which is connected to a plurality of ports 21, ..., 22 of the switching network 3. Signal processor 25 has sufficient capacity to process the signals received from the switching network for a substantial number of channels, terminated at ports 21, ..., 22.

Most current data calls using in-band signalling are identified by special un-modulated tones. However, other types of signals can be used to identify such calls. For example, a tone modulated by frequency or phase shift keying, or a tone modulated by amplitude or frequency modulation can be used to identify a data call. The signal processor 25 can be readily programmed to identify such signals.

Switching network 3, in the preferred embodiment, is a digital network which transmits digital signals between lines connected to stations 1, ..., 2 and trunks 4, or detectors 5, 6. Such a network can readily transmit the digital signals which represent an analog signal from one source to a number of destinations. This makes it easy to connect a detector, as well as a line, to an outgoing trunk 4. Thus, for an outgoing call, switching network originally establishes path 11 between station 1 and digit/tone detector 5. After the customer has dialed the requested number, the connection 12 is established between station 1 and outgoing trunk 4; when answer is received, tone detector 6 or digit/tone detector 5 is bridged on to this connection by connection 13 so that the tone detector can detect whether any of the tones characteristic of a data connection are present. While the connection 13 is shown in FIG. 1 as being to the trunk 4, it can be to any point in the connection between trunk 4 and the line connected to station 1.

The switching network operates under the control of a processor 30. Processor 30 includes memory 31 for storing a control program and measurement data, and a central processing unit (CPU) 32 for controlling network 3 and for receiving information from detectors 5 and 6. The programs shown in flow diagrams 3 and 4 are executed in processor 30. The diagram illustrates only an outgoing call. For an incoming call and for an intra-office call, the tone detector 6 or digit/tone detector 5 can also be bridged across a connection; the tone detector is bridged to a connection from an incoming trunk in the same way as it is bridged to a connection to an outgoing trunk and it is bridged across a connection between two lines in a bridging connection (not shown) since two lines can also be interconnected by switching network 3.

It is important to be able to monitor incoming as well as outgoing calls and intra-office calls. Incoming calls should be monitored since they may be headed toward a very high occupancy server, which although it does not originate many (or even any) calls, nevertheless has the very high usage characteristic of some of the other data terminals. Intra-office calls should be monitored to detect a group of modems, connected as lines, provided by a data carrier and connected to a separate data network supplied by that carrier. To the switching system of which switching network 3 is the switching element, such calls appear to be calls terminated at a multi-line hunt group, such as the hunt group of incoming trunks to a private branch exchange (PBX). Clearly, the modems of such a data carrier would have very high usage.

Figure 3:
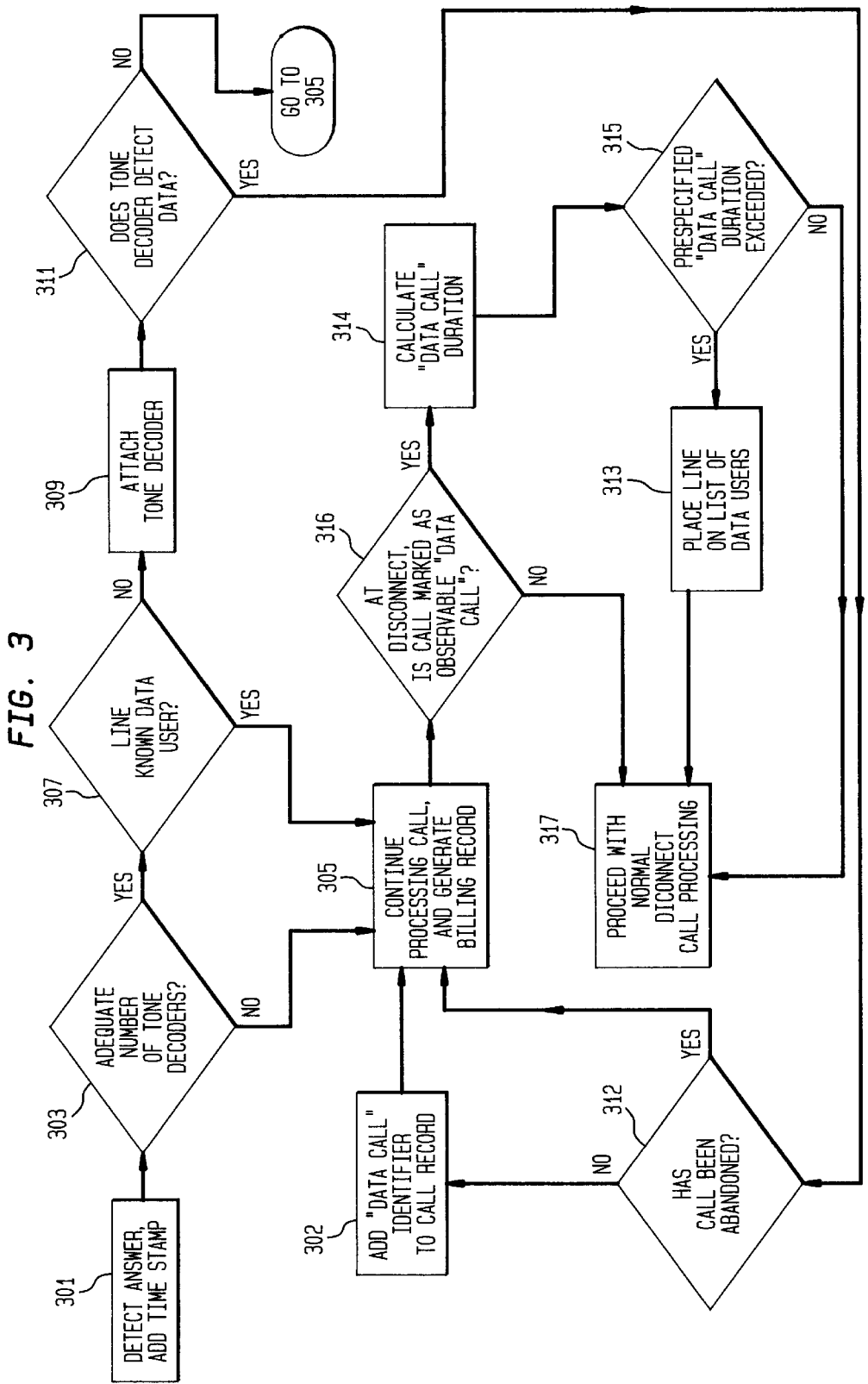
FIGS. 3–4 are flow diagrams illustrating applicants' invention.

FIG. 3 is a flow diagram of a method for detecting data calls for lines which are candidates for monitoring to establish whether their occupancy usage is high. In action block 301, an answer is detected. This answer may be the answer from a remote switch, in the case of an outgoing call, or it may be a locally detected answer, in the case of an incoming call or intra-office call. A time stamp is added to each answered call (action block 301).

Since the objective of applicants' invention is to detect very high usage lines, it is not necessary to be able to check every call to detect whether it is a data call. Fewer detectors will be required if this detection is not performed during the busiest hour. In applicants' preferred embodiment, the circuits for detecting data calls are the same as the circuits for detecting customer dialed information. It is only required that a sufficient number of circuits be provided to perform the latter function, a necessary function, even during the busiest hour. Therefore test 303 determines whether an adequate number of tone detectors is available. If not, the answer signal is processed without evaluating the call as a data call (action block 305). If an adequate number of tone detectors is available, then test 307 is used to determine whether the line for which an answer was detected in known to be a data user. If so, then answer processing can be continued without evaluating the call as a data call (action block 305). If not, a tone detector is attached to the call (action block 309). Test 311 determines whether the tone detector detects tone(s) indicating a data call.

Such tones, if any are present, should be detected within 3 seconds of the receipt of the answering signal. The length of time that the tone detector checks for tone can be altered by an operating company to accommodate special needs and/or new types of equipment. If the tone detector does not detect the data call tones, then processing of the answer is continued without marking the call by transferring to action block 305. If the tone detector does detect the tone(s) characteristic of a data call, then test 312 is used to filter out calls to wrong numbers wherein the callers disconnect as soon as they hear a data call tone; thus test 312 checks whether the call has been abandoned. If so, the call remains unmarked as a "data call" and call processing continues (action block 305). In case of a negative result of test 312, a line is a preliminary candidate for further extensive measurements provided that the length of the call exceeds some minimum duration, the minimum duration being a parameter that can be set by a telephone operating company according to the needs of the company and the traffic characteristics of its heavy data users. Following a negative result of test 312 the call is identified as an observable data call (action block 302). Following this negative result of test 312 processing of the call is continued and a billing record is generated (action block 305). At disconnect time, test 316 determines whether the call was observable as a "data call". If not, proceed with normal disconnect call processing (action block 317). If the call was observable as a "data call", the duration of the call is calculated (action block 314). Test 315 determines whether the minimum duration for data calls that are to be candidates for further measurement has been exceeded. If not, normal call processing is resumed (action block 317). If so (positive result of test 315), the line is placed on a list of data users (action block 313) and further measurements of this line will subsequently be taken, and normal disconnect call processing is now resumed (action block 317).

Figure 4:
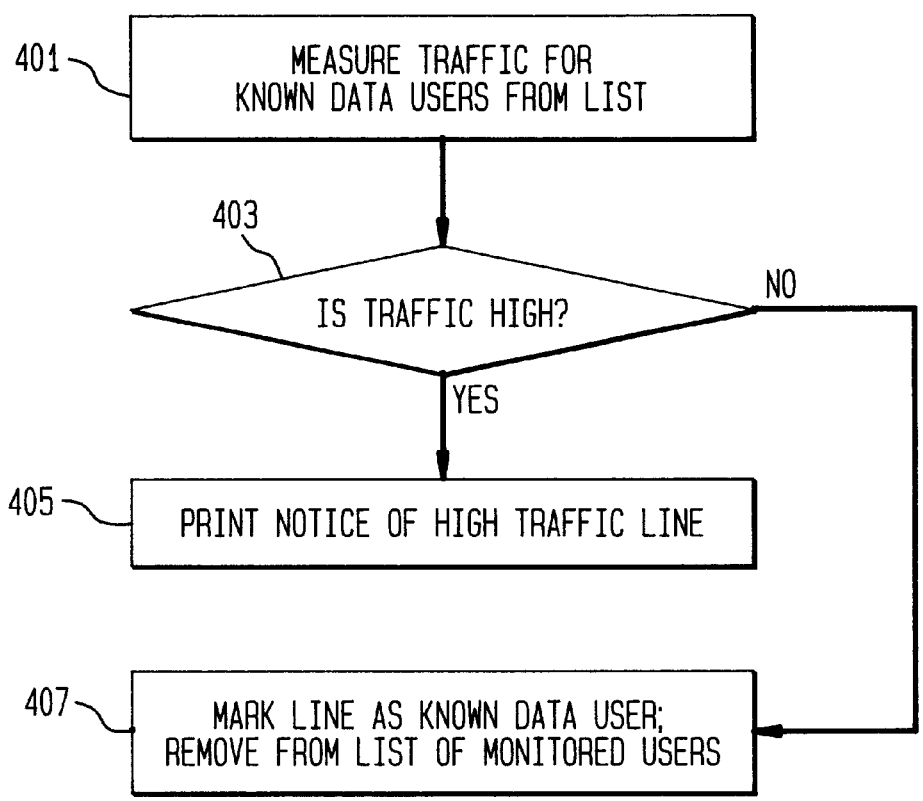

FIG. 4 describes the method of dealing with known data users. The traffic of such known data users from the list is measured over an extended period of time (action block 401). Following this period of time, a test 403 determines whether the traffic is high. If so, then a notice is printed identifying a high traffic line (action block 405) and appropriate action for this line left to the office administration staff. If the traffic is not high, then the line is marked as a known data user but is removed from the list of monitored users (action block 407).

Periodically, lines which are marked as data users and which had been previously monitored and found not to be high users should be re-examined. A simple way of examining these lines again is to un-mark them for a predetermined interval of time, set by an operating company (for example, 1 month) as being data users so that they can be rediscovered using the techniques of FIG. 3. Alternatively, these lines can simply have their traffic measured periodically in accordance with the method of FIG. 4. The object of these procedures is to detect lines which, while originally not heavy data user, become heavy data users after a time. Many similar arrangements, using the principles of this invention, can be derived by those of ordinary skill in the art. The invention is limited only by the attached claims.

We claim:

1. In a telecommunication switching system, a method of detecting a high occupancy usage line, comprising the steps of:

responsive to reception of an originating call, connecting a tone detector to said call in said switching system to determine whether said call is a data call;

if said call is a data call, identifying a line originating said call as a candidate line for further measurements; and measuring long term occupancy usage of the candidate line to determine whether the originating line is a high occupancy usage line.

2. In a telecommunication switching system, a method of detecting a high occupancy usage line, comprising the steps of:

responsive to reception of an incoming call, testing connecting a tone detector to said call in said switching system to determine whether said call is a data call;

if said call is a data call, identifying a line terminating said call as a candidate line for further measurements; and measuring long term occupancy usage of the candidate terminating line of that said incoming call to determine whether said terminating line is a high occupancy usage line.

3. In a telecommunication switching system, a method of detecting a high occupancy usage line, comprising the steps of:

responsive to reception of an intra-office call, testing connecting a tone detector to said call in said switching system to determine whether said call is a data call;

if said call is a data call, identifying a line terminating said call as a candidate line for further measurements; and measuring long term occupancy usage for the candidate terminating line of said intra-office call to determine whether said terminating line is a high occupancy usage line.

4. The method of claim 1 wherein said testing is performed for less than all originating calls during a busy hour.

5. The method of claim 1, 2, or 3 wherein if the step of measuring usage determines that the measured line is a high usage line, generating a report message to a traffic administrator.

6. The method of claim 1, 2, or 3 wherein the step of testing comprises the step of testing for a signal indicating a data call.

7. The method of claim 6 wherein the step of testing for a signal comprises connecting an enhanced digit receiver to said call.

8. The method of claim 7 wherein the step of testing is canceled is insufficient digit receivers are currently available.

9. The method of claim 7 wherein the step of testing is canceled during a busy hour.

10. The method of claim 6 wherein the step of testing for a signal comprises connecting a signal detector to said call.

11. The method of claim 10 wherein the step of testing comprises connecting said signal detector to said call after an answer signal has been detected.

12. The method of claim 10 wherein connecting said signal detector comprises connecting a signal processor shared for a plurality of calls for detecting signals in any of said plurality of calls.

13. The method of claim 11 wherein the step of testing comprises connecting a tone detector to said call.

14. The method of claim 6 wherein the step of testing comprises the step of testing for a tone indicating a data call.

15. The method of claim 1 wherein if the step of measuring usage determines that a measured line is not a high usage line, preventing that line from being measured again for a predetermined interval.

16. Apparatus for detecting a high usage line comprising:

a switching network;

a plurality of tone signal detection circuits for detecting signals indicating a data call; and processor means, operative under the control of a program stored in a memory of said processor means for controlling said network;

said processor means, responsive to reception of an originating call, controlling one of said tone signal detection circuits to test for a signal indicating that said call is a data call;

if said call is a data call, said processor means identifying a line originating said call as a candidate line for further measurements; and said processor means measuring long term occupancy usage for the candidate line that originated said call to determine whether said line is a high occupancy usage line.

17. In a telecommunication switching system, a method of detecting a high occupancy usage line, comprising the steps of:

responsive to reception of an originating call, testing connecting a tone detector to said call in said switching system to determine whether said call is a data call;

if said call is a data call, testing whether a duration of said call exceeds a predetermined quantity;

if said call is a data call exceeding said predetermined quantity, identifying a line originating said call as a candidate line for further measurements; and measuring long term occupancy usage of the candidate line that originated said originating call to determine whether the originating candidate line is a high occupancy usage line.

18. In a telecommunication switching system, a method of detecting a high occupancy usage line, comprising the steps of:
- responsive to reception of an incoming call, connecting a tone detector to said call in said switching system to determine whether said call is a data call;
- if said call is a data call, testing whether a duration of said call exceeds a predetermined quantity;
- if said call is a data call exceeding said predetermined quantity, identifying a line terminating said call as a candidate line for further measurements; and
- measuring long term occupancy usage of the candidate terminating line of said incoming call to determine whether said candidate line is a high occupancy usage line.

19. In a telecommunication switching system, a method of detecting a high occupancy usage line, comprising the steps of:
- responsive to reception of an intra-office call, testing connecting a tone detector to said call in said switching system to determine whether said call is a data call;
- if said call is a data call, testing whether a duration of said call exceeds a predetermined quantity;
- if said call is a data call exceeding said predetermined quantity, identifying a line terminating said call as a candidate line for further measurements; and
- measuring long term occupancy usage for a terminating line of said intra-office call to determine whether said candidate line is a high occupancy usage line.

* * * * *